United States Patent [19]
Scott

[11] 3,806,701
[45] Apr. 23, 1974

[54] ELECTRIC COOKING UTENSIL HAVING A REMOVABLE VESSEL

[75] Inventor: Robert J. Scott, Blue Springs, Mo.

[73] Assignee: Rival Manufacturing Company, Kansas City, Mo.

[22] Filed: Nov. 3, 1972

[21] Appl. No.: 303,479

[52] U.S. Cl............... 219/438, 219/386, 219/436, 219/543
[51] Int. Cl............................................. F27d 11/02
[58] Field of Search .......... 219/385, 386, 387, 421, 219/432, 433, 436, 438, 439, 464, 521, 543; 13/25

[56] References Cited
UNITED STATES PATENTS

| | | | |
|---|---|---|---|
| 2,603,740 | 7/1952 | Del Buttero | 219/543 X |
| 2,701,296 | 2/1955 | Crawford | 219/436 |
| 3,177,341 | 4/1965 | De Woody et al. | 219/385 |
| 2,939,807 | 6/1960 | Needham | 219/543 X |
| 3,108,170 | 10/1963 | Murphy | 219/543 X |
| 3,349,722 | 10/1967 | Davis | 219/543 X |
| 3,395,266 | 7/1967 | Price | 219/433 |
| 3,585,357 | 6/1971 | Mandell et al. | 219/433 X |
| 3,646,321 | 2/1972 | Siegla | 219/464 |

FOREIGN PATENTS OR APPLICATIONS

| | | | |
|---|---|---|---|
| 1,023,834 | 2/1958 | Germany | 219/438 |
| 355,874 | 9/1961 | Switzerland | 219/438 |
| 412,083 | 10/1945 | Italy | 219/438 |
| 903,746 | 1/1945 | France | 219/438 |

Primary Examiner—Volodymyr Y. Mayewsky

[57] ABSTRACT

An electric ceramic utensil is used to provide heat to a potentially electrically conducting foodstuff contained within the ceramic utensil. The utensil has a bottom and wall of refractive material forming a cup-shaped vessel for holding the foodstuff. The bottom and wall have a first side facing into the vessel and a second side facing externally of the vessel. The second side is unglazed and a thermal conductive, electric resistive material is combined with the second side of the wall and bottom to form an impervious coat thereon. An electric resistance heater is spiralled around the wall of the vessel to provide the heat necessary for cooking the foodstuff. A second electric resistive material is used to coat the first material and the resistance heater to provide an electrically insulated coat about the heater. A container is provided externally of the bottom and wall of the cooking utensil to support the vessel. Insulation extends between the second material and wall of the container so that the vessel may be handled while the foodstuff is being heated.

3 Claims, 3 Drawing Figures

PATENTED APR 23 1974    3,806,701

ELECTRIC COOKING UTENSIL HAVING A REMOVABLE VESSEL

BACKGROUND AND BRIEF DESCRIPTION OF THE INVENTION

It is well known to wrap an electric heater around the outside of a vessel for providing heat to partially liquid foodstuff, such as baked beans and soups. In normal construction, the earthenware or ceramic vessel is glazed on the inside of the vessel to provide an impervious coating for preventing the passage of the liquid material therethrough. Usually, this coating is on the side of the earthenware that faces into the vessel, thus prohibiting the flow of electricity from the electric heater, along the electrically conductive foodstuff into the vessel, and possibly to the user of the utensil. However, this construction has a very undesirable characteristic, namely that of the coat being constructed from the refractory material from which the ceramic vessel is constructed. A refractory material is brittle, a sharp rap to the glazed coating could fracture the refractory material and the coating, thus allowing passage of the electrically conducting substance into contact with the electric heater. Further, since a substantial number of users of electric cooking utensils stir the contents of the vessel with a metal spoon or ladle, a possibility always exists that the user will fracture or chip the glaze coating with the stirring utensil. Also the coating may be fractured by jarring the vessel through normal usage, as when the crock is washed or when placing it in storage. Additionally, thermal shock can easily fracture the coating through thermal expansion and contraction. If for the above or any other reason, the coating is fractured the refractory material will permit a passage of the electrical conductive liquid food substance into contact with the electric heating element and possibly produce an electrical shock to the user who contacts the food in the vessel.

It is one of the primary objects of this invention to provide a uniquely constructed apparatus that is electrically insulated from a potentially electrically conductive substance being heated within an electric cooking utensil including a vessel constructed of crockery or earthenware material.

A further object of the invention is to provide a cooking utensil having a thermal conductive, electric resistive material on the outside edge of the refractory material forming a vessel wall. Further it is significant that the vessel wall is resistant to cracking should the vessel be struck by a relatively substantial force on the inside edge of the vessel wall.

A further object of the invention is to provide in a vessel of the character described, a thermal conductive, electric resistive material on the outside edge of a vessel bottom for providing a seal externally of the refractory material to insure that the potentially electrically conductive food stuff is held within the vessel while cooking or warming.

Another object of this invention is to provide a cooking or warming utensil having a second electric resistive material adhering to a first thermal conductive, electric resistive material and to a heating element wrapped about the cup-shaped vessel of the utensil thereby providing a seal around the heating element for allowing total emersion of the vessel construction for cleaning and washing purposes.

A further object of this invention is to provide an electric ceramic vessel having a thermal insulated container about the exterior of same to provide for support in handling the vessel when the vessel is being used to heat a substance there within.

These and other objects of the invention, together with the features of novelty appurtenant thereto, will appear in the course of the following description.

DETAILED DESCRIPTION OF THE INVENTION

In the accompanying drawings which form a part of this specification and are to be read in conjunction therewith and in which like reference numerals are employed to indicate like parts in various views.

Figure 1:
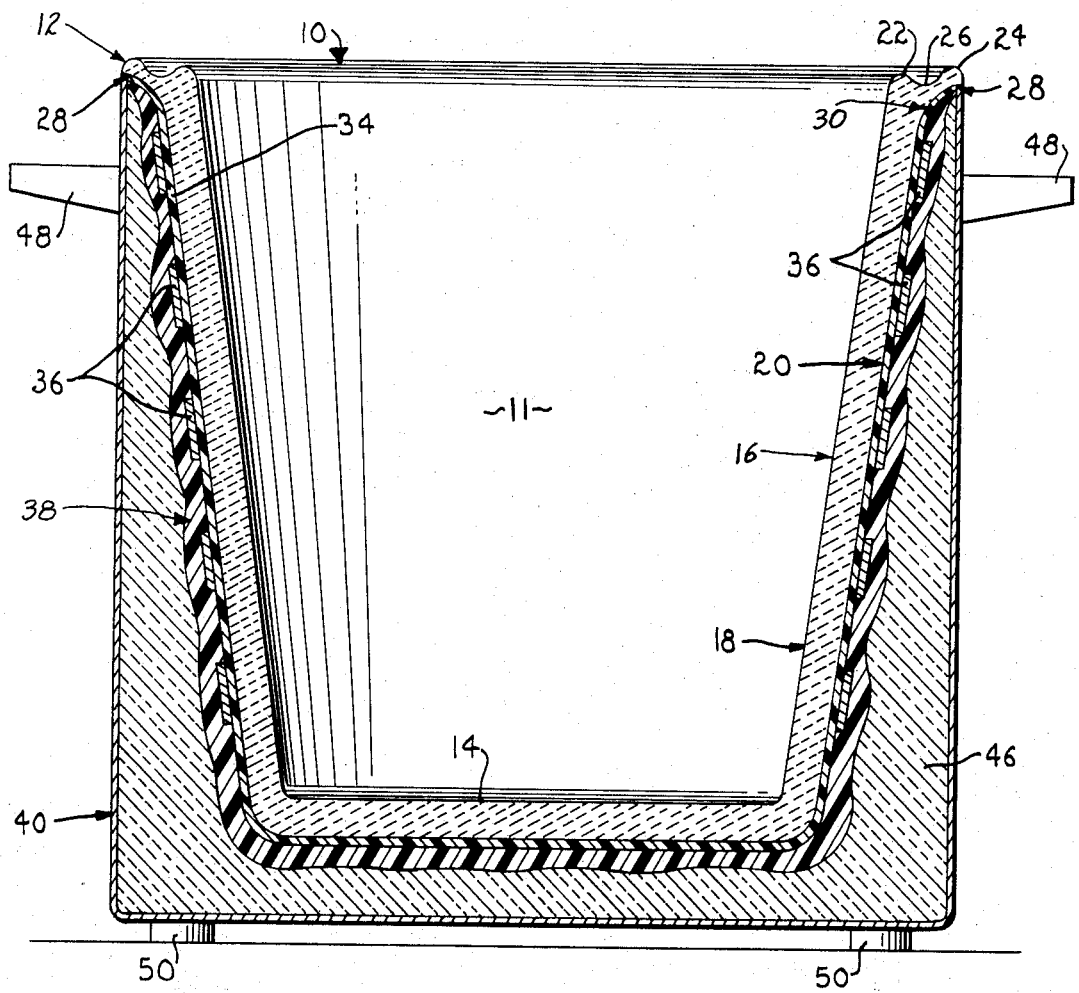
FIG. 1 is a front vertical, sectional view of the utensil construction, showing the relationship between the separate elements of the invention.
Figure 2:
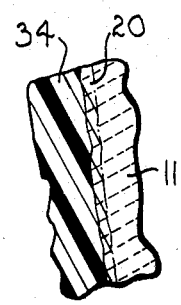
FIG. 2 is an enlarged vertical, sectional view showing the cohesion between the refractory material and the first thermal conductive, electric resistive material.
Figure 3:
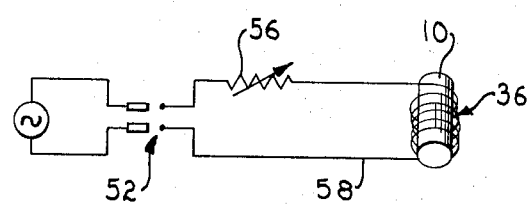
FIG. 3 is a schematic diagram illustrating the relationship between the electrical apparatus employed within the utensil structure and a power supply.

Referring now to the drawing, and more particularly to FIG. 1 thereof, a cooking utensil 10 has a cup-shaped vessel portion 11 and a lip portion 12. It is contemplated that the vessel will be constructed of a lightweight ceramic material that is thermal conductive, such as earthenware or stoneware. The vessel 11 is formed by bottom 14 and upwardly diverging wall 16. Bottom 14 and wall 16 have an inner side 18 (usually glazed) facing into vessel 11 and exterior second side 20. As illustrated, the thickness of bottom 14 and sidewall 16 (distance between inner side 18 and exterior side 20) is usually maintained constant within vessel 11. The exterior side 20 will be unglazed and, as will be seen, accommodates and supports the electrical mating elements and the resin varnish.

Lip 12 of vessel 11 has an inside ridge 22 and a higher outside concentric ridge 24 with a valley 26 located therebetween. This ridged lip construction facilitates the placing of a cover over the food substance within vessel 11 as same is being cooked or warmed.

The outer and under portion of lip 12 has a smooth arcuate contour as indicated by the numeral 30. For ease of construction, vessel 11 will be formed such that the ceramic material is provided with a smooth and continuous surface, except for junction edge 28, to substantially eliminate possible thermal stresses within the ceramic material.

As suggested above, the exterior wall 20 of the vessel 11 is unglazed. A silicone varnish will be applied to the entire exterior from junction edge 28 downwardly including the bottom of the vessel 11 and will be absorbed by the ceramic refractory material. The silicone varnish is of the type that is thermally conductive to allow heat passage when heat is applied to the vessel by the electric heater elements 36. Additionally, the silicone varnish will waterproof the exterior surface of vessel 11 and, since the silicone varnish actually penetrates into the unglazed surface of the ceramic material, minute cracks and chipped areas will likewise be waterproof. The silicone material builds up to a predetermined thickness on the exterior of the ceramic material to thereby form an electrical barrier against any leakage current from the heating elements and also operates to hold the heating elements 36 in the proper location. Further, since the coating, when hardened, is elastic in nature it is extremely resistent to fracture and it is unlikely to be chipped as it is fully encapsulated or otherwise protected from direct and damaging blows.

The heating element mentioned above will be comprised of a plurality of electrical resister elements 36 and will be wrapped in a spiral fashion around the exterior wall 20 of vessel 11 and on the outside of the silicone varnish 34. It is contemplated that the size, number and shape of the heating elements may be varied in accordance with the size of the vessel construction.

A second coat of silicon varnish 38 will be applied to the exterior of first coat 34 into the exterior of the heating elements 36. For convenience of illustration, the second coat has been shown and indicated as being substantially similar to the silicone varnish applied directly to the exterior surface of the vessel itself. However, it is really only necessary that the second coat be electrically resistent and does not necessarily have to be thermally conductive. Actually, if the type of later described insulating material that surrounds the exterior of the heating elements is suitably chosen, it is possible to eliminate the second application of the silicone varnish. However in the preferred embodiment, utilization of the second coat of silicone varnish further insulates the electrical heating elements and eliminates potentially harmful shocks, and helps hold the heating elements 36 in place.

The vessel 11 is supported in a plastic container 40 that is essentially cylindrical in shape with feet 50 located on the bottom portion thereof. It is contemplated that the container diameter will be of such that the upper peripheral edge of the container will contact and bear against the substantial flat underportion of the lip 12 (diagrammatically indicated by the numeral 28). An insulating material 46 will be inserted inside of container 40 and will fill the space between the exterior of vessel 11 and the interior of the container 40. This insulating material will have the necessary properties of prohibiting the transfer of heat away from vessel 11. Further, the heat insulating properties of material 46 will enable a user to grasp the handles 48 (which extend outwardly from container 40 as shown in FIG. 1) without a danger of being burned.

It is contemplated that the insulating material 46 will be poured or otherwise formed of a suitable contour during the construction of the entire cooking utensil and will provide a suitable receptacle to receive the vessel with the varnish coating on the exterior so as to substantially support the weight of the pot and to eliminate some of the dynamic loading from the side of the container 40. Further, it is possible to cause the insulating material to adhere directly to the exterior of the vessel thereby precluding the vessel from being removed from the container. Alternatively of course, the insulating material can be integrally formed with the housing with the vessel removable for cleaning purposes and the like. However, with the present structure both vessel and container may be placed with water and washed without fear of damage to the electrical heating components.

In operation, electrical resistant heating element 36 is interconnected to a conventional wall outlet by plug 52 through rheostat 56. Current through conductors 58 heats the heating elements 36 and eventually vessel 11 by conducting the heat from elements 36 through the coating 34 and into the ceramic material. Rheostat 56 controls the amount of heat that is being emitted from the elements 36, and as such may vary the operation of the vessel from a "warmer" or slow cooker to faster cooking temperatures.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An electric cooking utensil comprising a cup shaped vessel, said vessel being comprised of ceramic or earthenware material and having an exterior surface,
   a thin electric heating element, said electric heating element being wrapped and attached adjacent the exterior surface of said vessel and operable to heat said vessel and its contents when an electric current is applied thereto,
   a container for locating and thermally and electrically insulating said vessel and said electric heating element,
   electrical conductor means for applying said electric current to said electric heating element, and
   a first electrically non-conductive coating applied to said exterior of said vessel, said coating waterproofing said vessel and being located between said electric heating element said exterior surface,
   said exterior surface of said vessel having at least a portion thereof that is unglazed, said first electrically non-conducting coating having at least a portion thereof that is absorbed interiorly of said unglazed exterior surface portion of said vessel accomplishing said water-proofing of said vessel.

2. The combination as in claim 1 including a second electrically non-conducting coating, said second coating being applied to said heating element and to said first coating and operable to further electrically insulate said electric heater from the user of said electric utensil.

3. The combination as in claim 1, said vessel having an annular lip with a portion of said lip occupying a substantially horizontal plane, said thermally insulated container having a substantially flat upper peripheral edge, said upper peripheral edge operable to engage said horizontal portion of said lip and to provide a supporting surface for said vessel.

* * * * *

UNITED STATES PATENT OFFICE
CERTIFICATE OF CORRECTION

Patent No. 3,806,701                     Dated  April 23, 1974

Inventor(s)   Robert J. Scott

It is certified that error appears in the above-identified patent and that said Letters Patent are hereby corrected as shown below:

Column 3 -- line 15 -- "silicon" should be --silicone--.

Column 4 -- line 43 -- insert --and-- between "element" and "said

Signed and sealed this 3rd day of December 1974.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,806,701
DATED      : April 23, 1974
INVENTOR(S) : Robert J. Scott It is certified that error appears in the above-identified patent and that said Letters Patent are hereby corrected as shown below:

Please change the title to read:

Electric Ceramic Utensil Construction

Column 3 - line 15 - "silicon" should be --silicone--.

Column 4 - line 43 - insert --and-- between "element" and "said"

This certificate supersedes certificate issued December 24, 1974

Signed and Sealed this

Sixteenth Day of May 1978

[SEAL]

Attest:

RUTH C. MASON
Attesting Officer

LUTRELLE F. PARKER
Acting Commissioner of Patents and Trademarks